United States Patent Office 3,170,663
Patented Feb. 23, 1965

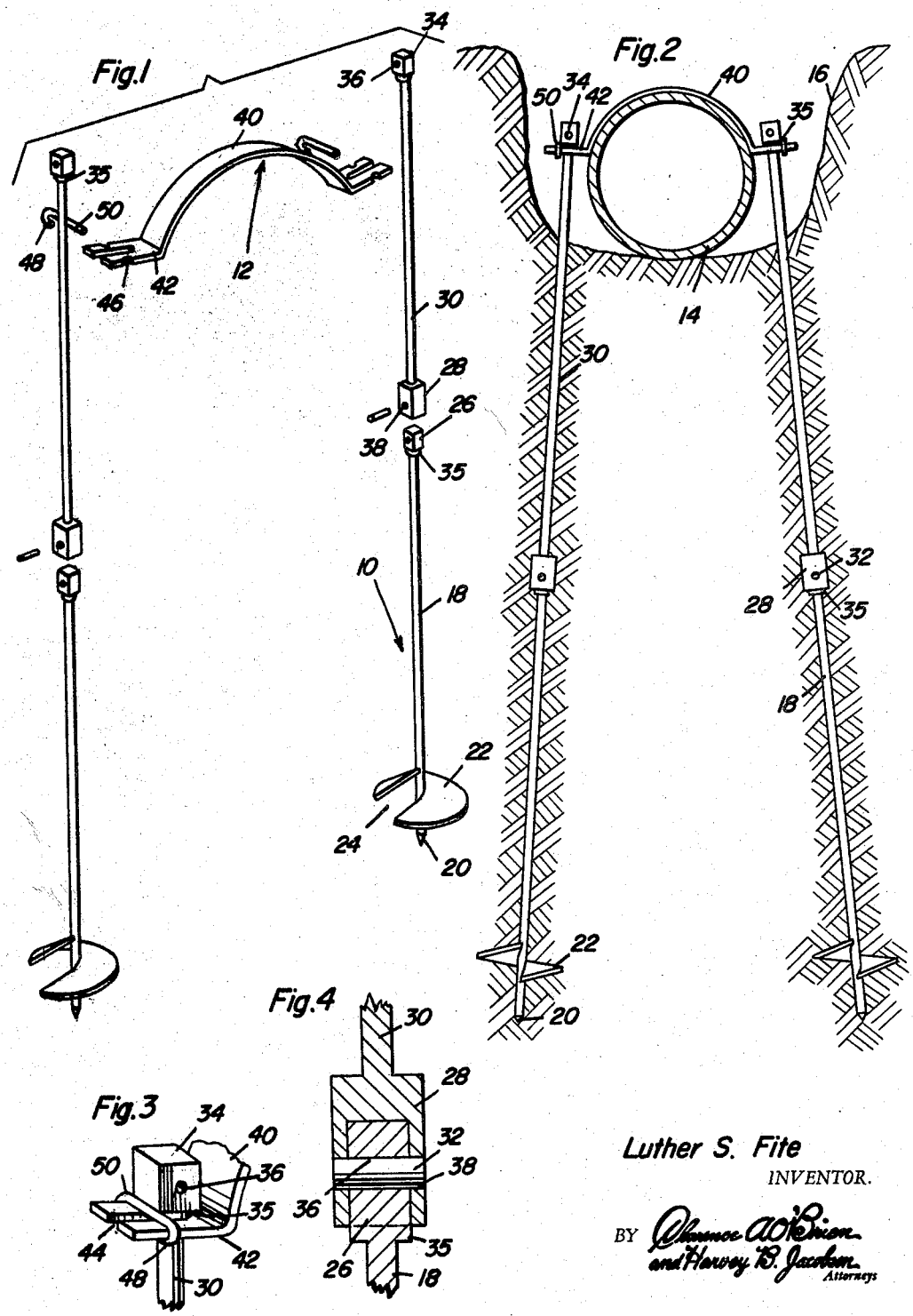

3,170,663
SCREW TYPE EARTH ANCHOR AND PIPELINE
SADDLE
Luther S. Fite, Natchez, Miss., assignor to
W. D. Tyra, Sr., Dallas, Tex.
Filed Oct. 20, 1960, Ser. No. 63,774
7 Claims. (Cl. 248—49)

The present invention generally relates to an anchoring device for pipelines which are subject to flotation and more particularly relates to an earth anchor of the screw auger type and a novel pipe saddle structure and interconnection between the earth anchor and saddle.

In recent years, there has been considerable development in relatively larger diameter pipelines such as are employed to convey gases or the like. Such pipelines are disposed under ground and quite often, the conditions are swampy and it becomes necessary to hold the pipes down and prevent flotation. This has been accomplished usually by counterweighting with concrete or the like which is quite expensive and time-consuming. There have been some developments employing earth anchors of the type which have an expansible lower end which will expand after it has been inserted into the ground surface. Earth anchors are normally provided with upper ends which extend through the apertured ends of a pipe saddle. One example of this type of construction is shown in prior Patent No. 2,474,920. Such devices as have been previously employed fail in certain respects to fully solve the problem. Where the pipe saddle is provided with an aperture, it is necessary that the earth anchor be orientated in a particular relationship to the pipe saddle or else it wil not be aligned with the aperture. This usually requires that the earth anchor be driven into position while the pipe saddle is on the pipe which makes it rather cumbersome and quite often the earth anchor will bind in the aperture through the pipe saddle. In some instances, there has been an endeavor to use an auger type anchor in which the headed upper end which receives the driving tool is screw threaded onto the rod by particular lock nut assembly which supposedly will enable the nut assembly to be removed from the end of the rod after the anchor has been set in position therefore enabling the upper end of the rod to be inserted through the apertured pipe saddle. Quite often, the lock nut assembly will become jammed in position and it becomes necessary to hold the earth anchor rod with a wrench or the like in order to remove the lock nut assembly without removing the earth anchor from the earth.

Therefore, it is a very important object of the present invention to provide a screw auger earth anchor having a permanently attached polygonal end portion which is larger than the rod for receiving a suitable wrench-type tool which is powered by any suitable motivating force or the enlarged polygonal head may receive an extension pinned thereto by a shear pin or the like which enables the earth anchor to be driven down to a desired set level by merely adding as many extensions as desired.

Another very important feature of the present invention is the novel structure of the pipe saddle and its relationship to the earth anchor, whereby the earth anchor may be engaged with the pipeline saddle without the earth anchor being at any critical position or angle and the pipeline saddle having slotted ends receiving the earth anchor rod thereby enabling the earth anchor to be driven without it being engaged with the pipeline saddle and subsequently engaging the anchors with the saddle.

Still another feature of the present invention is to provide a structure in which a novel wire clip is provided for retaining the earth anchor engaged with the pipeline saddle.

Still other objects of the present invention will reside in its simplicity of construction, ease of operation, ease of use, efficiency in installation and its generally inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the earth anchor and pipeline saddle of the present invention;

FIGURE 2 is an elevational view of the earth anchor and pipeline saddle illustrating its relationship to a pipeline when installed;

FIGURE 3 is an enlarged fragmental perspective view of the connection between the pipeline saddle and the upper end of the earth anchor; and FIGURE 4 is a detailed sectional view illustrating the connection between the earth anchor rod and an extension.

Referring now specifically to the drawings, the numeral 10 generally designates the earth anchor of the present invention while the numeral 12 generally designates the pipeline saddle for engagement over the upper portion of a pipe 14 for retaining it in place such as in a a ditch or excavation 16 provided therefor. The particular size of the pipe 14 may vary which, of course, will vary the size of the pipeline saddle and the position of the pipe 14 may vary as may the provision of the earth anchors 10. Each earth anchor 10 is provided with an elongated rod 18 having a pointed lower end 20 thereon and a spiral flight 22 rigidly secured thereto as by welding. The flight 22 is disclosed as involving only a single convolution around the rod 18 but a multiple of convolutions may be provided if desired. The lead of the spiral flight 22 is such that the opening 24 defined by the leading and trailing edges of the flight will permit passage of small gravel or stone thus enabling insertion of the earth anchor 10 by rotation without small rocks deflecting the path of movement of the earth anchor. Of course, large rocks will deflect the earth anchor but the spiral flight 22 will still proceed down to a desired level in the earth's surface to anchor the pipe 14.

The upper end of the earth anchor rod 18 is provided with a polygonal enlargement 26 which may engage the pipeline saddle 12 itself or which may receive a socket 28 on an extension rod 30. The socket 28 and the enlarged head 26 are interconnected by a transverse pin 32 which does not transmit any torsional force but will resist longitudinal movement of the rod 30 away from the rod 18. The upper end of the extension rod 30 is provided with an enlarged polygonal head 34, the same size as the head 26. The head 26 and the head 34 are both provided with apertures 36 for receiving the pin 32 and the socket 28 is also provided with an aperture 38 receiving the pin 32. Thus, the number of extensions 30 which may be employed may be varied with each extension having a head 34 equivalent in shape and size to the head 26 on the rod 18. Thus, the head 26 or the head 34 may be engaged with the pipe saddle 12 and the device will operate in the same manner regardless of the length of the earth anchor.

The pipe saddle 12 includes an arcuate band 40 of metal which is partially cylindrical for engagement with the upper surface of the pipe 14. The strap or band 40 may flex inwardly or outwardly for receiving various diameters of pipe 14 within certain limits. However, if the differential in the diameter of the pipes is considerable, then different size saddles 12 may be used.

Each end of the strap or band 40 is provided with a laterally extending rigid flange 42 which extend outwardly and slightly upwardly substantially in perpendicular relation to the earth anchor rod 18. Each flange 42 is provided with a slot or notch 44 therein capable of receiving the earth anchor rod 18 or the extension rod 30 with the head 26 or the head 34 disposed against the top surface of the flange 42. With this construction, the earth anchor may be inserted into the ground surface to the desired level and the pipe saddle then orientated in relation thereto and the earth anchor may be engaged with the slot or notch 44.

Each outer edge of the flange 42 is provided with a notch or recess 46 therein for receiving the inwardly bent ends 48 of a wire clip 50. The wire clip 50 serves to retain the anchor rod 30 or 18 in place.

Even after the clips 50 have been disposed in place, the extension rod 30 or the anchor rod 18 is retained in the notch 14 but may be readily disconnected therefrom by mere removal of the clip 50 thus eliminating the necessity of removing the headed end of the rod or completely removing the rod wherein it is desired to release the pipe 14 for any reason. Also, the extension construction enables a power tool to engage initially the upper end of the earth anchor rod 18 and cause it to be driven down to a point adjacent the earth's surface and then provide an extension thereon and repeat the process as many times as is necessary. This eliminates the necessity of retaining an inventory of different lengths of earth anchors which may be necessary due to the particular conditions encountered in various localities.

As illustrated specifically in FIGURE 3 the lower end portion of headed end 34 is rounded into cylindrical form designated by numeral 35. The cylindrical portion 35 has a diameter equal to the width of the head 34. This allows the clips 50 to be inserted back toward the anchor rod in such a manner that the anchor rod will be retained in the inner end of the slot to insure the greatest strength of the bracket. This also allows assembly of the clip when the head is in any angular position about the longitudinal axis of the rod in relation to the clip.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pipeline saddle comprising an arcuate strap adapted to engage the upper portion of a pipe, outwardly extending flanges on each end of the strap, each flange having an inwardly extending notch on the radial outer edge thereof for laterally receiving an earth anchor rod, and means detachably engaged with the flange and bridging the notch for forming a closure therefor for retaining the earth anchor rod in the notch.

2. The structure as defined in claim 2 wherein said means includes a wire clip having the ends thereof deformed around the side edges of the flange, each side edge of the flange having a shallow notch therein receiving the ends of the clip thereby retaining the wire clip in position for retaining the earth anchor rod in the notch in the flange.

3. A combined earth anchor and pipeline saddle comprising an elongated rod having a spiral flight on the lower end thereof and a rigid head of unitary construction with the upper end thereof and having a cross sectional area greater than the rod, a saddle including an arcuate strap, outwardly extending flange means on each end of the strap, each of said flange means including a flange angled slightly upwardly and having a slot extending inwardly from the outer edge thereof for laterally receiving the earth anchor rod with the head on the upper end of the earth anchor rod engaging the top surface of the flange, and means bridging the slot in the flanges outwardly of the rod for releasably retaining the earth anchor rod in place therein.

4. A combined earth anchor and pipeline saddle comprising an elongated rod having a spiral flight on the lower end thereof and a rigid head of unitary construction with the upper end thereof and having a cross sectional area greater than the rod, a saddle including an arcuate strap, outwardly extending flange means on each end of the strap, each of said flange means including a flange angled slightly upwardly and having a slot extending inwardly from the outer edge thereof for laterally receiving the earth anchor rod with the head on the upper end of the earth anchor rod engaging the top surface of the flange, and means bridging the slot in the flanges outwardly of the rod for releasably retaining the earth anchor rod in place therein, said means including a bendable wire clip encircling the side edges of the flange, the side edges of said flange having notches receiving the inturned ends of the clip thereby retaining the earth anchor rod in the slot in the flange.

5. A combined earth anchor and pipeline saddle comprising an elongated rod having a spiral flight on the lower end thereof and a rigid head of unitary construction with the upper end thereof and having a cross sectional area greater than the rod, a saddle including an arcuate strap, outwardly extending flange means on each end of the strap, each of said flange means including a flange angled slightly upwardly and having a slot extending inwardly from the outer edge thereof for laterally receiving the earth anchor rod with the head on the upper end of the earth anchor rod engaging the top surface of the flange, and means bridging the slot in the flanges outwardly of the rod for releasably retaining the earth anchor rod in place therein, said means including a bendable wire clip encircling the side edges of the flange, the side edge of said flange having notches receiving the inturned ends of the clip thereby retaining the earth anchor rod in the slot in the flange, said rod being constructed of a plurality of sections, the upper end of said sections each having a head thereon of greater cross-sectional area than the rod and the lower end of each section except the bottommost section having the spiral flight thereon having a socket for telescopic engagement over the head, said head and socket being of complemental configuration so that torque may be exerted on the upper end of the uppermost section for rotating the rod and spiral flight thereon, and a fastener interconnecting the socket and head for transmitting longitudinal forces between the sections of the rod.

6. An earth anchor rod assembly comprising an elongated rod having a spiral flight on the lower end thereof, said rod being constructed of a plurality of sections, the upper ends of said sections each having a head thereon of greater cross-sectional area than the rod, the lower end of each section of the rod except the bottommost section having the spiral flight thereon having a socket for telescopic engagement over the head, said head and socket being unitarily constructed with the rod, said head and socket being of complemental configuration whereby torque may be transmitted from an upper section to a lower section for rotating the rod and spiral flight thereon, and a fastener interconnecting the telescopic socket and head for transmitting longitudinal forces between the sections of the rod, a pipe saddle having an arcuate central portion for engagement with a pipe, said strap having outwardly extending end flanges angled slightly upwardly when the strap is supported over a pipe, each flange having a lateral opening therein for receiving the upper end portion of the uppermost rod section whereby the head on the uppermost rod section will engage the upper surface of a flange for holding the saddle against the pipe, and means bridging the opening outwardly of the rod for releasably retaining the rod engaged with the flange.

7. The method of anchoring a pipe to the ground surface consisting of the steps of placing a saddle having outwardly directed notched flanges at the end thereof in overlying relation to the pipe to be anchored, extending an anchor rod having a spiral flight on the lower end thereof into the ground surface adjacent the pipe and saddle by rotating the anchor rod from an enlarged head at the upper end thereof with the rod orientated independent of the notched flange on the saddle, moving the rod into the notch in the flange on the saddle with the head on the upper end of the rod engaging the top surface of the flange, and extending a retaining clip across the notch outwardly of the rod for retaining the anchor rod in the notch in the flange at the end of the pipe saddle thereby assembling the rod, and pipe saddle for securing the pipe to the ground surface.

References Cited by the Examiner
UNITED STATES PATENTS

| | | | |
|---|---|---|---|
| 240,012 | 4/81 | Doud | 175—388 |
| 501,811 | 7/93 | Stombaugh | 189—91 |
| 606,914 | 5/98 | Bragger | 287—89 |
| 617,358 | 1/99 | Rieg | 248—361 X |
| 641,960 | 1/00 | Herfert | 175—388 |
| 894,250 | 7/08 | Woods | 289—119 X |
| 926,453 | 6/09 | Archibald | 9—32 |
| 995,297 | 6/11 | Schroeder | 189—91 |
| 1,224,690 | 5/17 | Townley | 287—89 |
| 1,283,246 | 10/18 | Maloney | 287—89 |
| 1,374,865 | 4/21 | Sherwood | 248—59 X |
| 1,481,396 | 1/24 | Ternes | 248—25 |
| 1,505,422 | 8/24 | Potter | 287—119 |
| 1,554,559 | 9/25 | Corcoran | 248—25 X |
| 1,722,363 | 7/29 | Young | 248—50 |
| 1,883,477 | 10/32 | Bash | 189—91 |
| 1,894,401 | 1/33 | Hollos | 189—91 |
| 2,002,103 | 5/35 | Wheeler | 248—49 |
| 2,326,317 | 8/43 | Amtsberg | 287—119 |
| 2,357,956 | 9/44 | Johnson | 248—49 |
| 2,373,439 | 4/45 | Wheatley | 248—49 X |
| 2,396,747 | 3/46 | Parrott | 287—119 |
| 2,402,682 | 6/46 | Shriro et al. | 248—361 |
| 2,446,315 | 8/48 | Williams | 248—361 |
| 2,474,360 | 6/49 | Jimerson | 287—119 |
| 2,474,920 | 7/49 | Stearns | 248—49 |
| 2,588,901 | 3/52 | Weikert | 287—119 X |
| 2,767,946 | 10/56 | Weeks | 248—50 |
| 2,858,093 | 10/58 | Knoll | 248—49 |
| 2,864,633 | 12/58 | Mackie | 287—117 |
| 2,890,848 | 6/59 | Johnson | 248—74 |

FOREIGN PATENTS

| | | |
|---|---|---|
| 360,350 | 11/31 | Great Britain. |
| 208,995 | 7/40 | Switzerland. |

CLAUDE A. LE ROY, *Primary Examiner.*

EARL C. DARSCH, *Examiner.*